(12) United States Patent
Kawabata

(10) Patent No.: US 10,638,000 B2
(45) Date of Patent: Apr. 28, 2020

(54) SYSTEM FOR PROVIDING IMAGE DATA VIA A SERVER, IMAGE PROCESSING APPARATUS, SERVER, METHOD FOR PROVIDING IMAGE DATA VIA A SERVER, AND NON-TRANSITORY RECORDING MEDIUM STORING COMPUTER READABLE PROGRAM

(71) Applicant: KONICA MINOLTA, INC., Chiyoda-ku, Tokyo (JP)

(72) Inventor: Hiroyuki Kawabata, Kawanishi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 55 days.

(21) Appl. No.: 15/457,203

(22) Filed: Mar. 13, 2017

(65) Prior Publication Data
US 2017/0264759 A1 Sep. 14, 2017

(30) Foreign Application Priority Data

Mar. 14, 2016 (JP) .................................. 2016-049993

(51) Int. Cl.
*H04N 1/00* (2006.01)
*H04N 1/21* (2006.01)
*H04N 1/32* (2006.01)

(52) U.S. Cl.
CPC ....... *H04N 1/00228* (2013.01); *H04N 1/2104* (2013.01); *H04N 1/32117* (2013.01); *H04N 2201/0094* (2013.01); *H04N 2201/3205* (2013.01); *H04N 2201/3229* (2013.01)

(58) Field of Classification Search
None
See application file for complete search history.

(56) References Cited

FOREIGN PATENT DOCUMENTS

| JP | 2003-006125 A | 1/2003 |
| JP | 2003-179721 | 6/2003 |
| JP | 2005-129976 A | 5/2005 |
| JP | 2005-278161 A | 10/2005 |
| JP | 2008-199180 A | 8/2008 |

(Continued)

OTHER PUBLICATIONS

English Transalation of Iwai, JP 2008-199180 (Year: 2008).*

(Continued)

*Primary Examiner* — Mohammad H Ghayour
*Assistant Examiner* — Pawan Dhingra
(74) *Attorney, Agent, or Firm* — Buchanan Ingersoll & Rooney PC

(57) ABSTRACT

An image processing apparatus reads an image depicted on paper to create image data of the image and saves the image data in a storage; selects an intermediary from among one or more servers based on an e-mail address designated; sends location data indicating a saving location of the image data or the image data to the intermediary in order to provide a terminal with the image data via the intermediary; sends, to the e-mail address, an message including access information for accessing the location data or the image data saved to the intermediary; and sends, when the intermediary is accessed by the terminal based on the access information and reques4USts the image data, and further, when data corresponding to the access information is the location data, the image data to the requesting server.

15 Claims, 15 Drawing Sheets

(56) References Cited

FOREIGN PATENT DOCUMENTS

| | | |
|---|---|---|
| JP | 2009-010779 | 1/2009 |
| JP | 2010-055392 A | 3/2010 |
| JP | 2012-199699 | 10/2012 |

OTHER PUBLICATIONS

English Transalation of Kiyoshi, JP 2005-278161 (Year: 2005).*
Notice of Reasons for Refusal issued in corresponding Japanese Patent Application No. 2016-049993, dated Aug. 15, 2019 (12 pages).

* cited by examiner

FIG. 8A

```
IN ORDER TO BROWSE THE SCANNED IMAGE, PLEASE CLICK
THE URL BELOW.

http://www.konicaminolta.com/103/image003.pdf?Job_ID=A0001
```

FIG. 8B

IN ORDER TO BROWSE THE SCANNED IMAGE, PLEASE CLICK THE URL BELOW.

http://www.example.co.jp/202/shortcut005

| JOB IDENTIFIER | FILE NAME | DOWNLOAD FLAG | SENT DATE AND TIME | |
|---|---|---|---|---|
| A0001 | image003.pdf | 0 | 2016/1/4 11:20 | ~64 |
| A0002 | document01.pdf | 1 | 2016/1/4 11:30 | ~64 |
| A0003 | photo.tiff | 0 | 2016/1/4 11:35 | ~64 |
| A0004 | document03.pdf | 0 | 2016/1/4 11:41 | ~64 |
| A0005 | report2015.pdf | 0 | 2016/1/4 11:52 | ~64 |
| ⋮ | ⋮ | ⋮ | ⋮ | |

SYSTEM FOR PROVIDING IMAGE DATA VIA A SERVER, IMAGE PROCESSING APPARATUS, SERVER, METHOD FOR PROVIDING IMAGE DATA VIA A SERVER, AND NON-TRANSITORY RECORDING MEDIUM STORING COMPUTER READABLE PROGRAM

The present U.S. patent application claims a priority under the Paris Convention of Japanese patent application No. 2016-049993 filed on Mar. 14, 2016, the entirety of which is incorporated herein by reference.

BACKGROUND OF THE INVENTION

1. Field of the Invention

The present invention relates to a technology for creating electronic data of an image read from a paper sheet to provide the electronic data.

2. Description of the Related Art

Image processing apparatuses into which functions such as copying, network printing, faxing, scanning, and e-mail are integrated have attained widespread use. In general, such an image processing apparatus is sometimes called a "multifunction device", a "Multi-Functional Peripheral (MFP)", or an "image forming apparatus".

Further, the scanning function and the e-mail function are combined to implement a function of Scan_To_Email. According to the Scan_To_Email function, an image is read from paper to create image data thereof, and the image data is attached to an e-mail message so that the image data is sent to a destination of a designated e-mail address.

It has recently become possible for such an image processing apparatus to save, to a server, electronic data of an image read from paper (image data) with the scanning function. Then, a terminal, e.g., a personal computer or a smartphone accesses the server to use a file saved thereto.

There are provided a variety of servers. For example, a server is included in an intranet. Such a server gives access permission only to a terminal included in the intranet and a device external to the intranet and establishing a connection based on a particular protocol. Such a server is a Network Attached Storage (NAS). Alternatively, an image processing apparatus functions as a server of this type in some cases.

Another server allows access from different devices via the Internet. Such a server is, for example, a cloud server (online storage).

There have been proposed technologies, discussed below, for sending and receiving data among users.

One of the technologies is directed to a network system (English abstract of Japanese Laid-open Patent Publication No. 2005-129976). In the network system, the Internet is connected to a digital copying machine via gateways and a firewall, and external personal computers and a web server are connected to the digital copying machine via the Internet. The digital copying machine can transmit read image data of an original to the web server in the network system above. Further, the digital copying machine transmits a URL of the storage destination of the transmitted image to the personal computers via the Internet, in the form of mail. Users of the personal computers receiving the mail from the digital copying machine, can browse an image read by the digital copying machine and download the image to the personal computers by accessing the URL designated by mail.

Another one of the technologies is directed to a network composite machine (English abstract of Japanese Laid-open Patent Publication No. 2005-278161). In the network composite machine connected with the network, to which a plurality of communication protocols are applied and which communicates various kinds of data with other terminals, it is provided with a file transmitting means for transmitting an e-mail notifying a URI for acquiring a document file stored in the self-terminal to a designated destination.

Yet another one of the technologies is directed to a system (English abstract of Japanese Laid-open Patent Publication No. 2008-199180). The system includes an MFP, a server, and terminals and does not allow the terminals to access the server. In the system, a file is transmitted from the MFP to the server and is preserved. The MFP transmits mail indicating that the MFP accepts browsing as a file operation to the file preserved in the server to a specified terminal. The mail includes the URL of the MFP and the URL is linked. The terminal transmits the request of browsing to the MFP when the URL displayed on a screen is clicked by a user. The MFP requests the transmission of the file to the server and acquires it when browsing is requested from the terminal. The MFP transmits the acquired file to the terminal to have it displayed on the screen according to the request of browsing requested by the user.

Yet another one of the technologies is directed to a document management terminal (English abstract of Japanese Laid-open Patent Publication No. 2010-055392). The document management terminal transmits a file held in the terminal to a document management device through a network in a predetermine case to store the file on the document management device. Then, the document management terminal generates a shortcut to the transmitted file. Files stored in the same layer as the transmitted file are also transmitted to the document management device, and a shortcut to the files is generated.

Yet another one of the technologies is directed to a method and device for mail conversion (English abstract of Japanese Laid-open Patent Publication No. 2003-006125). A mail conversion server separates the mail attached with a file, that a client who is a transmission host transmits the attached file from the mail text, the attached file is registered directly in a file server which is a storage destination, and information of the storage destination is attached to the mail text to be distributed to a mail server. The storage destination of the attached file is dynamically changed, based on a preset condition.

The use of Scan_To_Email function or the use of server enables image data to be sent and received among users.

According to the use of server, the users can send and receive image data therebetween even if the image data has a large size. For example, in general, the size of a file attachable to an e-mail message is a size of a few megabytes to several tens of megabytes. In contrast, the server can save a file independent of the file size as long as the file size does not exceed a size of a storage area allocated to a user in the server.

However, the use of server, involves accessing, by a user who is to receive the image data, the server based on information (for example, a URL of the image data) given by a user who is to send the image data, and downloading the image data by the recipient user. Further, the recipient user cannot download the image data unless he/she is not given a right to access the server. In light of this, the sender user needs to select a server to which the image data is to be uploaded depending on which user is to receive the image data.

In contrast, according to the use of Scan_To_Email, image data can be provided in the form of e-mail message directly from a user to another user without taking the foregoing situation into consideration.

However, as discussed above, the size of a file attachable to an e-mail message is limited. The Scan_To_E-Mail function is thus not suitable for sending/receiving image data having a large size.

SUMMARY

The present invention has been achieved in light of such an issue, and therefore, an object of an embodiment of the present invention is to provide image data having a large size from a user to another user more easily than is conventionally possible.

To achieve at least one of the objects mentioned above, according to an aspect, a system for providing image data includes an image processing apparatus; and one or more servers; wherein the image processing apparatus includes a scanner configured to read an image depicted on paper to create image data of the image, a first storage configured to save the image data thereto, a processor configured to select an intermediary from among a group of candidates including at least said one or more servers based on an e-mail address designated, and a transmitter configured to send, in response to any of said one or more servers being selected as the intermediary, location data indicating a saving location of the image data saved to the first storage or the image data saved to the first storage to the selected server, each of said one or more servers includes a second storage configured to save thereto the location data or the image data sent from the image processing apparatus, the transmitter further sends, to the e-mail address, an e-mail message including access information for accessing the location data or the image data saved to the selected server, the transmitter further sends, in response to a request by any of said one or more servers, the image data to the requesting server, in response to access by a terminal based on the access information, when data corresponding to the access information saved to the second storage is the image data, the transmitter sends, to the terminal, the data corresponding to the access information saved to the second storage, and in response to access by the terminal based on the access information, when the data corresponding to the access information saved to the second storage is the location data, the transmitter obtains the image data from the image processing apparatus based on the data corresponding to the access information saved to the second storage and sends the image data obtained to the terminal.

To achieve at least one of the objects mentioned above, according to another aspect, an image processing apparatus includes a transmitter; a scanner configured to read an image depicted on paper to create image data of the image; a storage configured to save the image data created by the scanner; and a processor configured to select an intermediary from among a group of candidates including at least one or more servers based on an e-mail address designated; wherein in response to any of said one or more servers being selected as the intermediary, the transmitter sends location data indicating a saving location of the image data saved to the storage or the image data saved to the storage to the selected server in order to provide a terminal with the image data saved to the storage via the selected server, the transmitter sends, to the e-mail address, an e-mail message including access information for accessing the location data or the image data saved to the intermediary, and when any of said one or more servers is accessed by the terminal based on the access information and requests the image data, and further, when data corresponding to the access information is the location data, the transmitter sends the image data to the requesting server.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein:

FIGS. 8A and 8B are diagrams showing examples of an additional message;

FIG. 9 is a diagram showing an example of transmission result data;

DESCRIPTION OF THE PREFERRED EMBODIMENTS

Hereinafter, an embodiment of the present will be described with reference to the drawings. However, the scope of the invention is not limited to the illustrated examples.

Figure 1:
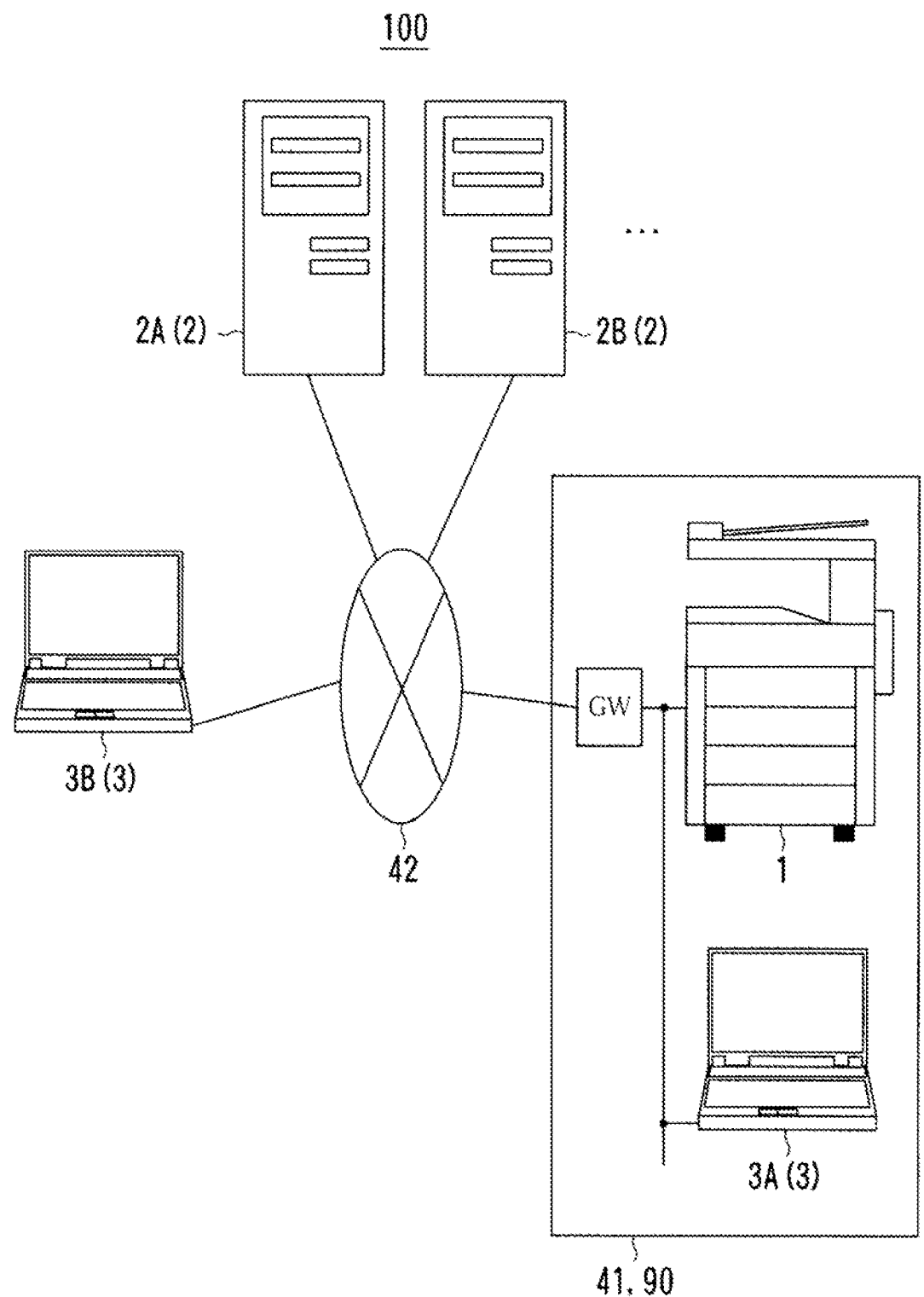
FIG. 1 is a diagram showing an example of the overall configuration of an image data providing system.
Figure 2:
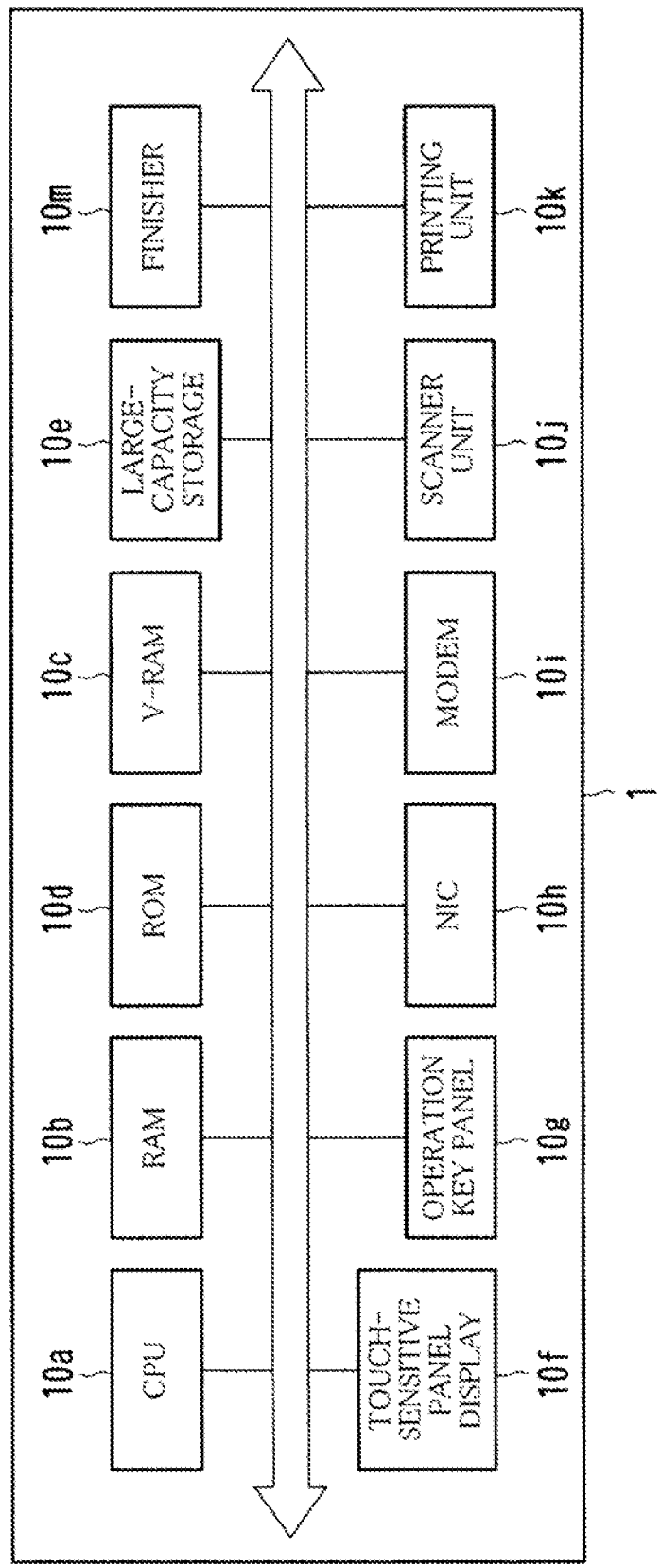
FIG. 2 is a diagram showing an example of the hardware configuration of an image processing apparatus.
Figure 3:
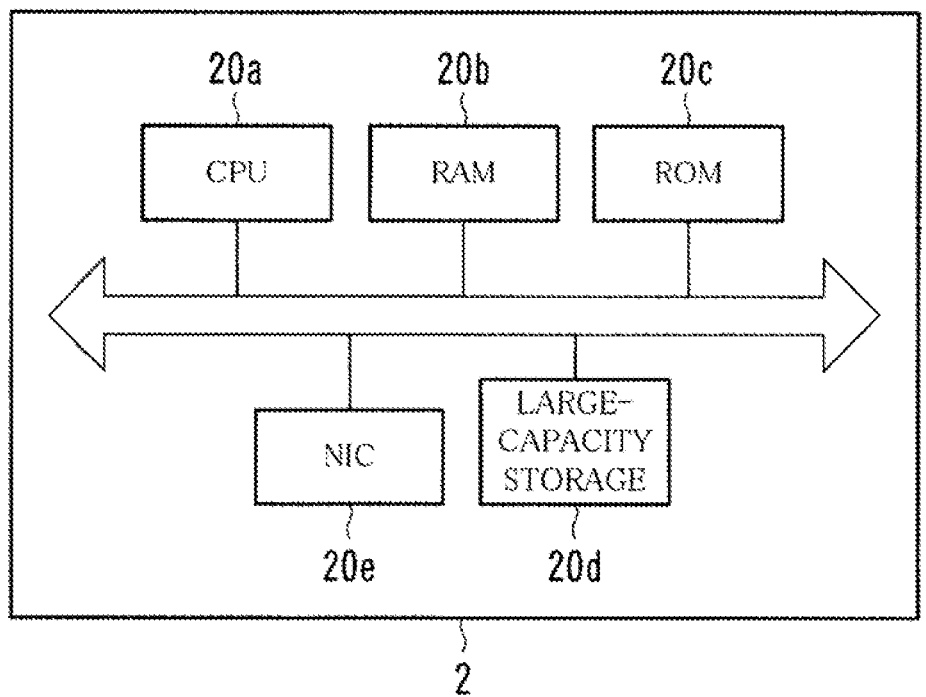
FIG. 3 is a diagram showing an example of the hardware configuration of a server.
Figure 4:
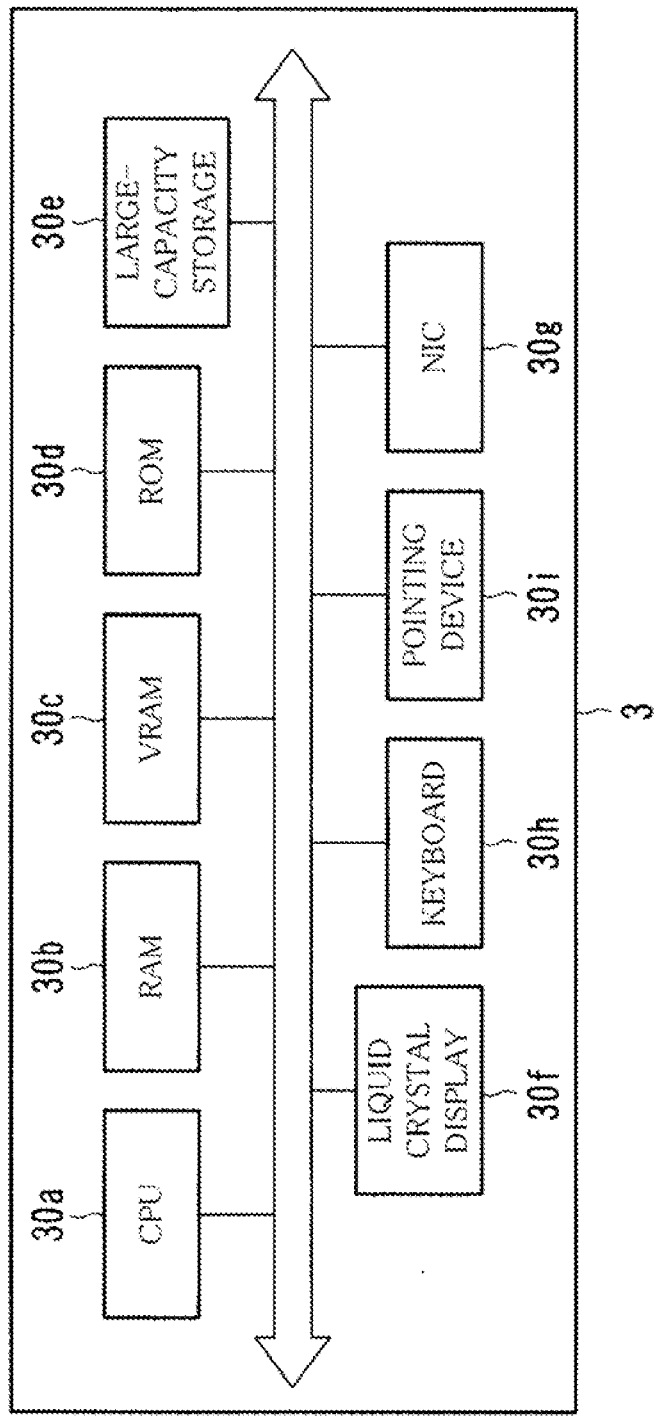
FIG. 4 is a diagram showing an example of the hardware configuration of a terminal.

FIG. 1 is a diagram showing an example of the overall configuration of an image data providing system 100. FIG. 2 is a diagram showing an example of the hardware configuration of an image processing apparatus 1. FIG. 3 is a diagram showing an example of the hardware configuration of a server 2. FIG. 4 is a diagram showing an example of the hardware configuration of a terminal 3.

Referring to FIG. 1, the image data providing system 100 is configured of an image processing apparatus 1, a plurality of servers 2, a plurality of terminals 3, a communication line 4, and so on.

The image data providing system 100 enables a user to distribute an electronic file of an image depicted on a paper sheet to other users. The following is a description of an example in which the image data providing system 100 is used by employees of a corporation 90. A user who distributes (sends) an image is sometimes referred to as a "source user". A user who is given (receives) the image is sometimes referred to as a "destination user".

Examples of the communication line 4 include the Internet 42 and an intranet 41 of the corporation 90. The communication line 4 also may be a public line or a mobile phone network. In some cases, the intranet 41 is implemented by one Local Area Network (LAN). In other cases, the intranet 41 is implemented by LANs at hubs connecting to one another by a public line or a dedicated line.

The image processing apparatus 1 is an apparatus into which functions to provide copying service, PC printing service, faxing service, scanning service, and box service are consolidated. The image processing apparatus 1 is sometimes called a "Multi-Functional Peripheral (MFP)", a "multifunction device", or an "image forming apparatus".

The PC printing function is to print an image onto paper based on image data received from the terminal 3. The PC printing is also called "network printing" or "network print" in some cases.

According to the box function, each user is given a storage area called a "box" or "personal box", and each user saves an image file or the like to his/her storage area and manages the image file therein. The box corresponds to a "folder" or "directory" of a personal computer.

The image processing apparatus 1 also has an Extensible Messaging and Presence Protocol (XMPP) server function.

The image processing apparatus 1 is included in the intranet 41. The intranet 41 also has a gateway. The gateway has a firewall function for security protection. The gateway is so set that access from an external device to the intranet 41 is restricted more tightly than access from the intranet 41 to the outside.

To be specific, few restrictions are imposed on access from a device included in the intranet 41 to an external device. However, restrictions are so imposed that a device outside the intranet 41 is allowed to access a device in the intranet 41 only based on a particular protocol. In this embodiment, the particular protocol is XMPP, for example.

The image processing apparatus 1 is configured to perform communication via the gateway with a device outside the intranet 41, for example, with the server 2.

The server 2 is one to provide an online storage on the Internet 42. To be specific, the server 2 saves a file thereto and provides a file in response to a request from the terminal 3. Examples of the server 2 include a machine for web server having a Common Gateway Interface (CGI). Alternatively, the server 2 may be a so-called cloud server.

The server 2 is given information such as an account and password necessary to connect to the image processing apparatus 1 based on XMPP. Such information is hereinafter referred to as "XMPP client information".

The server 2 is run by, for example, an Internet Service Provider (ISP). The server 2 is sometimes referred to as a "server 2A", a "server 2B", . . . , and so on to distinguish one from another.

The terminal 3 is a client to use the foregoing service provided by the image processing apparatus 1 and the server 2. Examples of the terminal 3 include a laptop personal computer, a desktop personal computer, a smartphone, and a tablet computer.

The description goes on to a case where the terminal 3 is a laptop personal computer. The terminal 3 is sometimes referred to as a "terminal 3A", "terminal 3B", . . . , and so on with a serial number added thereto to distinguish one from another.

Some of the terminals 3 are included in the intranet 41, and other terminals 3 are outside the intranet 41. For example, the terminal 3A is included in the intranet 41 and the terminal 3B is outside the intranet 41.

The terminal 3 included in the intranet 41, for example, the terminal 3A, is capable of downloading a file directly from the image processing apparatus 1 without using the gateway. In contrast, the terminal 3 outside the intranet 41, for example, the terminal 3B, needs to download a file via the server 2.

Referring to FIG. 2, the image processing apparatus 1 is configured of a Central Processing Unit (CPU) 10a, a Random Access Memory (RAM) 10b, a Video RAN (VRAM) 10c, a Read Only Memory (ROM) 10d, a large-capacity storage 10e, a touch-sensitive panel display 10f, an operation key panel 10g, a Network Interface Card (NIC) 10h, a modem 10i, a scanner unit 10j, a printing unit 10k, a finisher 10m, and so on.

The touch-sensitive panel display 10f displays, for example, a screen for presenting messages to the user, a screen for allowing the user to enter commands or information, a screen for showing the results of processing executed by the CPU 10a. The touch-sensitive panel display 10f also sends a signal indicating a touched location to the CPU 10a.

The VRAM 10c is used to store, therein, data on a screen displayed in the touch-sensitive panel display 10f.

The operation key panel log is a so-called hardware keyboard. The operation key panel 10g is provided with numeric keys, a start key, a stop key, and a function key.

The NIC 10h performs communication with other devices in accordance with a protocol such as Transmission Control Protocol/Internet Protocol (TCP/IP).

The modem 10i sends and receives an image file with a facsimile terminal in accordance with a protocol such as G3.

The scanner unit 10j optically reads an image depicted on a paper sheet placed on a platen glass to generate an image file thereof.

The printing unit 10k prints, onto paper, an image captured by the scanner unit 10j and an image received by the NIC 10h or the modem 10i from other devices.

The finisher 10m staples sheets on which an image has been printed by the printing unit 10k, namely, a printed matter, or punches a hole in the printed matter.

The ROM 10d or the large-capacity storage 10e stores, therein, a program for implementing the foregoing functions for copy service and network printing service. The ROM 10d or the large-capacity storage 10e also stores, therein, a file providing program 10P as a program for the image processing apparatus 1 to provide the terminal 3 with a file in coordination with the server 2.

The programs are loaded into the RAM 10b as necessary and are executed by the CPU 10a. The large-capacity storage 10e is, for example, a hard disk drive or a Solid State Drive (SSD).

Referring to FIG. 3, the server 2 is configured of a CPU 20a, a RAM 20b, a ROM 20c, a large-capacity storage 20d, an NIC 20e, and so on.

The NIC 20e performs communication with the image processing apparatus 1 or the terminal 3 in accordance with a protocol such as TCP/IP.

The ROM 20c or the large-capacity storage 20d stores, therein, a file intermediary program 20P as a program for relaying a file generated by the image processing apparatus 1 to the terminal 3.

The file intermediary program 20P is loaded into the RAM 20b and is executed by the CPU 20a. The large-capacity storage 20d is, for example, a hard disk drive or an SSD.

Referring to FIG. 4, the terminal 3 is configured of a CPU 30a, a RAM 30b, a VRAM 30c, a ROM 30d, a large-capacity storage 30e, a liquid crystal display 30f, an NIC 30g, a keyboard 30h, a pointing device 30i, and so on.

The VRAM 30c is used to store data on an image displayed in the liquid crystal display 30f.

In the liquid crystal display 30f are displayed an e-mail message received from the image processing apparatus 1 and an image downloaded from the server 2.

The NIC 30g performs communication with the image processing apparatus 1, the server 2, and so on in accordance with a protocol such as TCP/IP.

The keyboard 30h and the pointing device 30i are used by the user to enter information and commands.

The ROM 30d or the large-capacity storage 30e has installed, therein, an operating system, a web browser, and a mailer, for example.

The programs are loaded into the RAM 30b as necessary and are executed by the CPU 30a. The large-capacity storage 30e is, for example, a hard disk drive or an SSD.

In a mailer of the terminal 3 included in the intranet 41, an e-mail address having a domain of the corporation 90 (or of the intranet 41) is set. In a mailer of the terminal 3 outside the intranet 41, an e-mail address having a domain other than the domain of the corporation 90 is set.

As described earlier, the image data providing system 100 enables the source user to distribute a file of an image depicted on a paper sheet to the destination user. Further, the file providing program 10P and the file intermediary program 20P enable the destination user to receive the image more conveniently than is conventionally possible. The mechanism thereof is described below.

Figure 5:
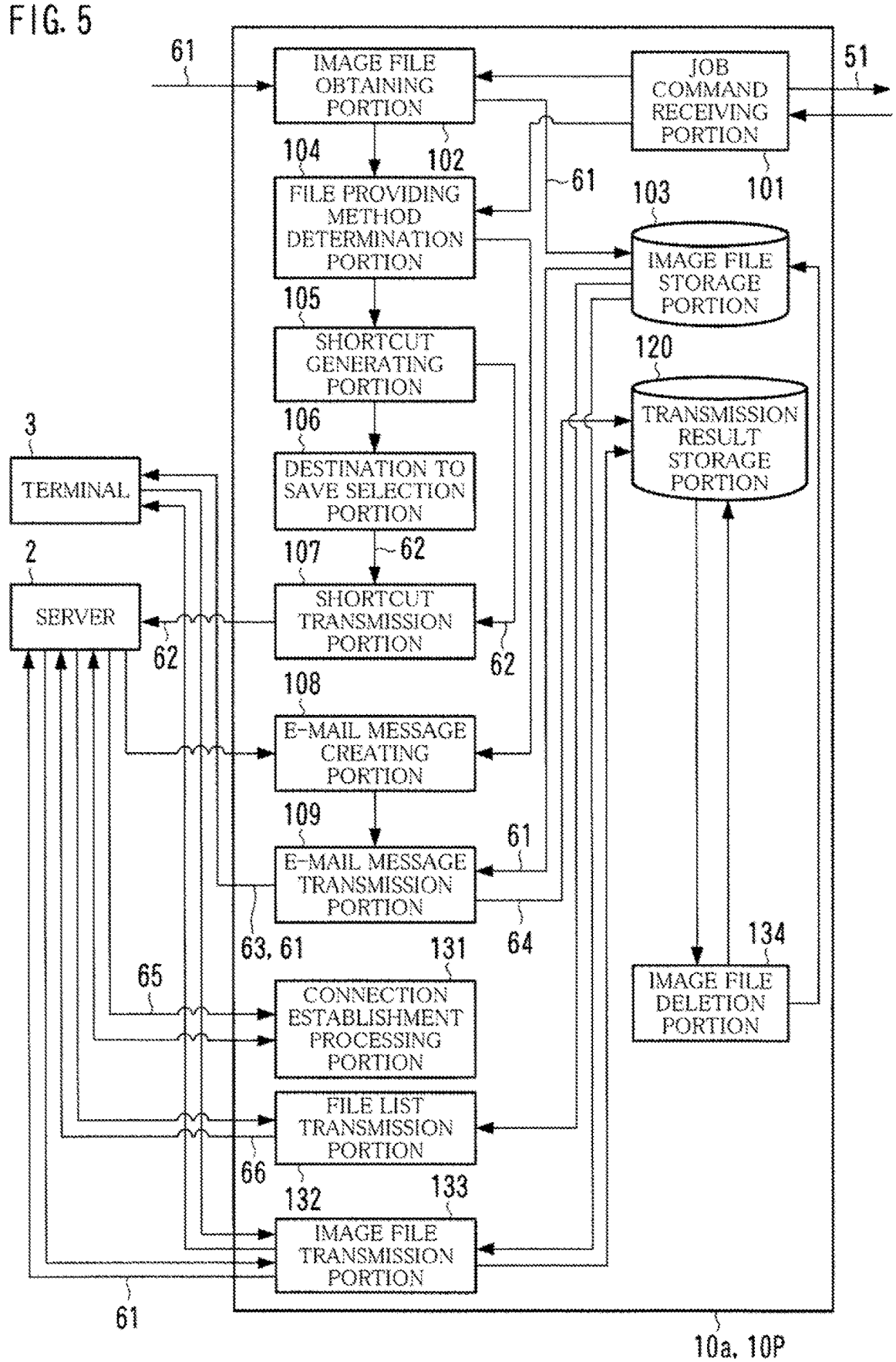
FIG. 5 is a diagram showing an example of the functional configuration of an image processing apparatus.
Figure 6:
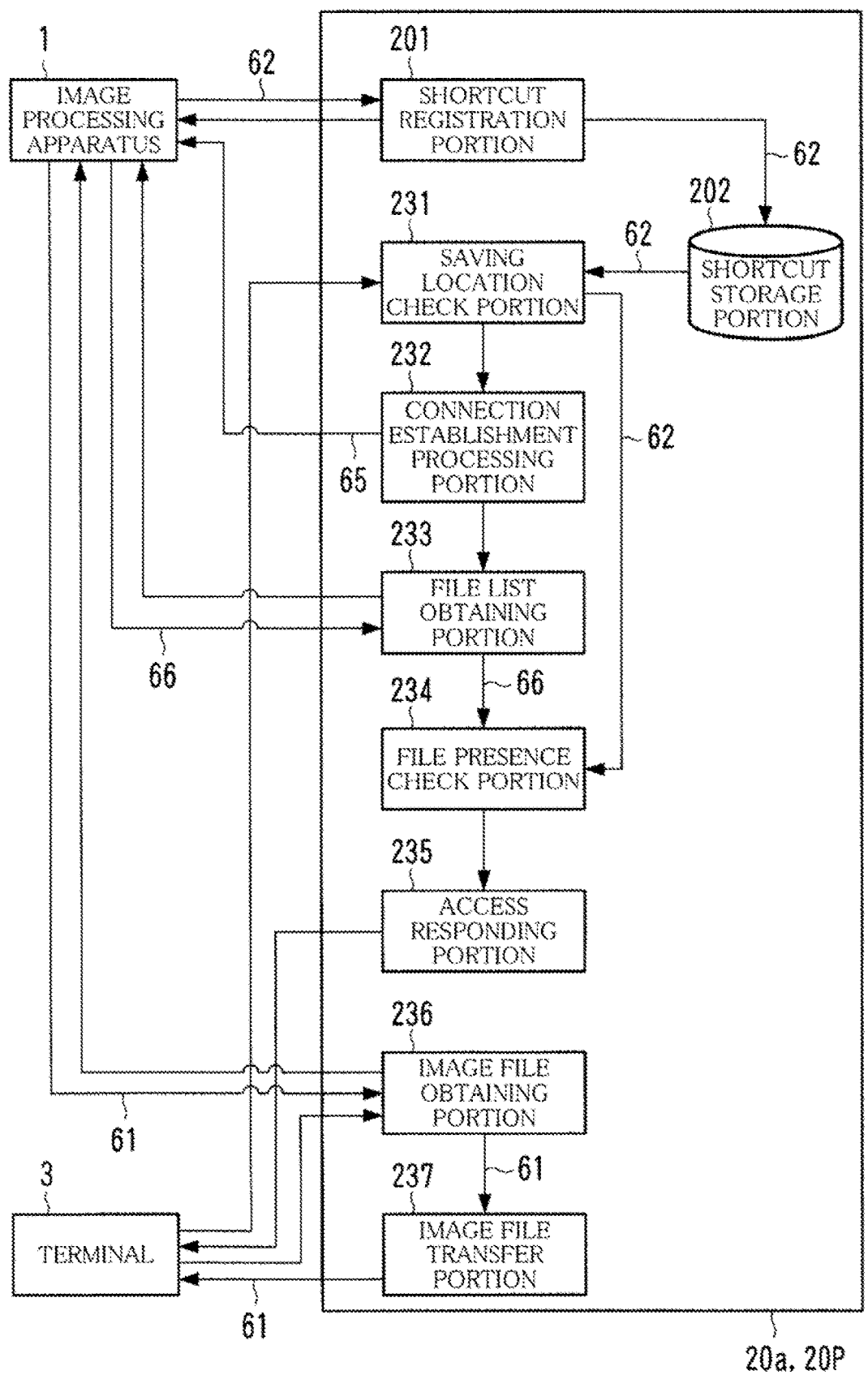
FIG. 6 is a diagram showing an example of the functional configuration of a server.

FIG. 5 is a diagram showing an example of the functional configuration of the image processing apparatus 1. FIG. 6 is a diagram showing an example of the functional configuration of the server 2.

The file providing program 10P implements, in the image processing apparatus 1, the functions of a job command receiving portion 101, an image file obtaining portion 102, an image file storage portion 103, a file providing method determination portion 104, a shortcut generating portion 105, a destination to save selection portion 106, a shortcut transmission portion 107, an e-mail message creating portion 108, an e-mail message transmission portion 109, a transmission result storage portion 120, a connection establishment processing portion 131, a file list transmission portion 132, an image file transmission portion 133, an image file deletion portion 134, and so on, all of which are shown in FIG. 5.

The file intermediary program 20P implements, in the server 2, the functions of a shortcut registration portion 201, a shortcut storage portion 202, a saving location check portion 231, a connection establishment processing portion 232, a file list obtaining portion 233, a file presence check portion 234, an access responding portion 235, an image file obtaining portion 236, an image file transfer portion 237, and so on, all of which are shown in FIG. 6.

[Preparing a Scanned Image File]

Figure 7:
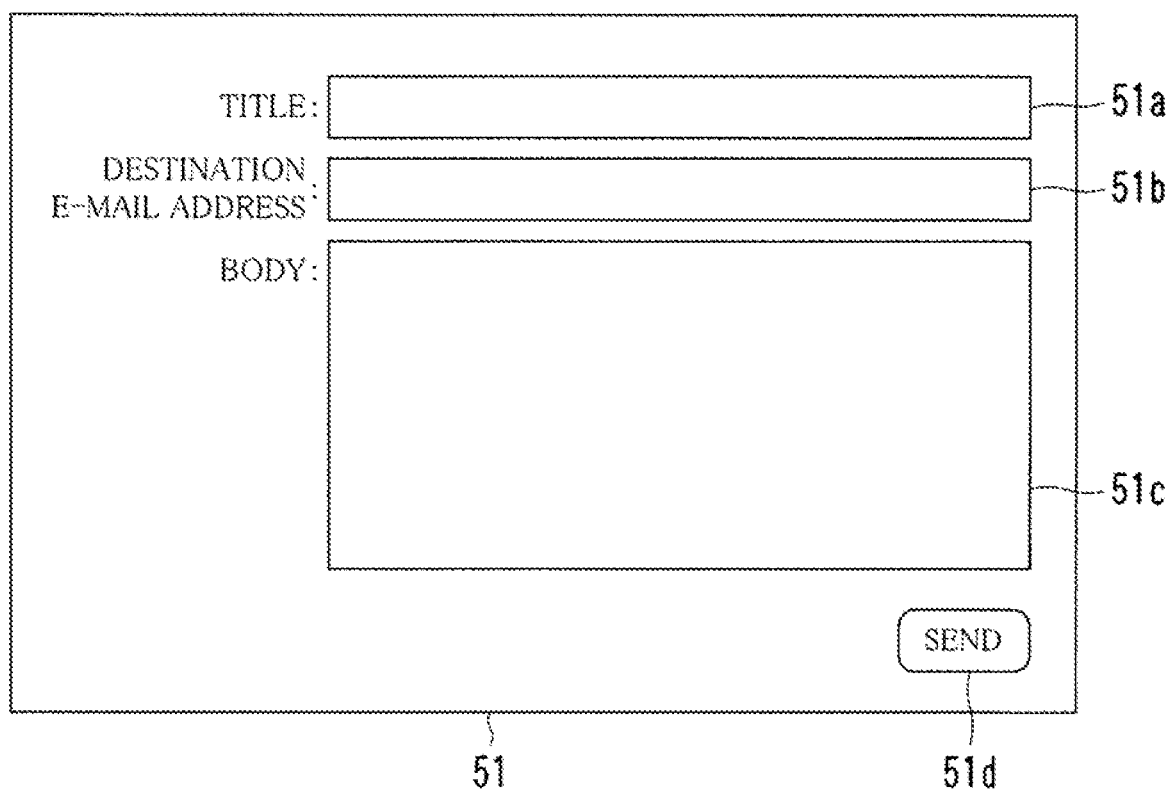
FIG. 7 is a diagram showing an example of a job conditions entry screen.

FIG. 7 is a diagram showing an example of a job conditions entry screen 51. FIGS. 8A and 8B are diagrams showing examples of an additional message. FIG. 9 is a diagram showing an example of transmission result data 64.

The job command receiving portion 101 performs processing for receiving conditions for a Scan_To_E-Mail job and a command to execute the Scan_To_E-Mail job in the following manner. The Scan_To_E-Mail job is a job of reading an image from a document sheet by the scanner unit 10j to create a file of the image and attaching the file to an e-mail message to send the e-mail message. In this embodiment, however, instead of the file, other information is added to an e-mail message and send the e-mail message in some cases. This will be described later.

When the source user performs predetermined operation, the job command receiving portion 101 displays the job conditions entry screen 51 as that shown in FIG. 7 on the touch-sensitive panel display 10f. The source user enters a title, a destination e-mail address, and a body of an e-mail message into text boxes 51a, 51b, and 51c respectively of the job conditions entry screen 51. In particular, the source user enters, as the destination e-mail address, an e-mail address of a user to whom the image is to be distributed, namely, a destination user. In this embodiment, it is assumed that only one e-mail address is entered. An example of processing for the case of entering a plurality of e-mail addresses will be detailed later.

The source user places, on the scanner unit 10j, a paper sheet on which an image to be distributed is depicted. The source user then presses a send button 51d.

In response to the send button 51d pressed, the job command receiving portion 101 receives the content entered by the source user as conditions for Scan_To_E-Mail job and receives the pressing of the send button 51d as a command for Scan_To_E-Mail job. The job command receiving portion 101 then issues a job identifier for identifying that Scan_To_E-Mail job.

When the job command receiving portion 101 receives the command for Scan_To_E-Mail job, the image file obtaining portion 102 controls the scanner unit 10j to scan the paper sheet to generate an image file of the image depicted on the paper sheet. Hereinafter, the image file thus generated is referred to as a "scanned image file 61". The image file obtaining portion 102 obtains the scanned image file 61 from the scanner unit 10j. The scanned image file 61 is given a unique file name.

The image file storage portion 103 stores, thereinto, the scanned image file 61 obtained by the image file obtaining portion 102. The image file storage portion 103 may be a predetermined box.

The file providing method determination portion 104 determines a method for providing the scanned image file 61 to the terminal 3 of the destination user as described below. Such a method is hereinafter referred to as a "file providing method".

Where a domain indicated in the e-mail address received by the job command receiving portion 101 is the domain of the corporation 90, the file providing method determination portion 104 determines to use a first providing method as the file providing method. The first providing method is a method in which the terminal 3 accesses the image processing apparatus 1 without the servers 2 to download the scanned image file 61.

The domain is identified by the whole or a part of a character string on the right side of "@" included in an e-mail address. Where the top-level domain included in the e-mail address is Generic Top-Level Domain (gTLD), the domain is identifiable based on the second-level domain and the top-level domain. For example, where the e-mail address is "aaa@mail.example.com", the domain is identified based on the character string of "example.com".

Where the top-level domain included in the e-mail address is Country Code Top-Level Domain (ccTLD), and further, where the domain name of the second-level domain is a predetermined domain name such as an organization type domain name or a region type domain name, the domain is identifiable based on the third-level domain, the second-level domain, and the top-level domain. For example, where the e-mail address is "aaa@mail.example.co.jp", the domain is identified based on the character string of "example.co.jp". Where the domain name of the second-level domain is not the foregoing predetermined domain name, in other words, is a general domain name, the domain is identifiable based on the second-level domain and the top-level domain. For example, where the e-mail address is "aaa@mail.example.jp", the domain is identified based on the character string of "example.jp".

In contrast, where the domain indicated in the e-mail address is not the domain of the corporation 90, the file providing method determination portion 104 determines to use a second providing method as the file providing method. The second providing method is a method in which any of the servers 2 downloads the scanned image file 61 from the image processing apparatus 1 and transfers the scanned image file 61 to the terminal 3.

Where the scanned image file 61 has a size equal to or smaller than a predetermined size, the file providing method determination portion 104 may determine to use a third providing method as the file providing method independently of what kind of domain is indicated in the e-mail address. The third providing method is a method in which the scanned image file 61 is attached to an e-mail message and the e-mail message is sent to the e-mail address. The file providing method determination portion 104 may determine to use any one of the first providing method and the second providing method independently of the size of the scanned image file 61. Whether or not to use the third providing method is settable freely.

When the file providing method determination portion 104 determines to use the second providing method as the file providing method, the shortcut generating portion 105 generates a shortcut 62 which indicates a saving location and file name of the scanned image file 61 and a job identifier of the Scan_To_E-Mail job. The shortcut 62 is a file used for the server 2 to access the scanned image file 61. The shortcut 62 is given a unique file name.

The destination to save selection portion 106 selects, from among the servers 2, one to save the shortcut 62. In this embodiment, where there is a server 2 of an issuer (ISP, for example) issuing an e-mail address of the destination user, the destination to save selection portion 106 selects that server 2. To be specific, where there is a server 2 having a domain which is the same as the domain of the e-mail address of the destination user, the destination to save selection portion 106 selects that server 2. Another configuration is possible in which data showing the correspondence between domains of e-mail addresses for individual ISPs and a domain of a cloud server is prepared in advance and an issuer is specified based on the data to select one of the servers 2.

Where there is no server 2 of an issuer, the destination to save selection portion 106 selects any one of the servers 2. A method for selecting one of the servers 2 independently of domains is described later.

For each of the users, data indicating whether or not the corresponding user can use the servers 2 is prepared in the destination to save selection portion 106. The servers 2 that the destination user cannot use are excluded from candidates for selection.

The domain of the server 2 is identifiable based on the domain name of the server 2 operating as the web server (for example, "www.example.com" or "www.example.co.jp") in accordance with the foregoing rules.

Where the server 2 selected has folders for online storage, the destination to save selection portion 106 selects a folder which can be used by both the source user and the destination user.

Examples of such a folder are as follows: (a1) a folder that any user having a user account for the server 2 can use; (a2) a folder that any user can use independently of whether or not the user has a user account for the server 2; and (a3) a folder that only specific users including the source user and the destination user can use.

The destination to save selection portion 106 preferably selects a folder that both the source user and the destination user can use in the following manner. For each of the users, data indicating whether or not the corresponding user can use folders is prepared in the destination to save selection portion 106. In the case of online storage, e-mail addresses are generally used as user IDs. In view of this, it is preferable to use e-mail addresses as information for identifying users, as for the data. Thereby, the destination to save selection portion 106 can select a folder that both the source user and the destination user can use based on an e-mail address of the source user and an e-mail address of the destination user.

The shortcut transmission portion 107 uses a known method to establish a connection with the server 2 and sends the shortcut 62 to the server 2 selected by the destination to save selection portion 106. Where the destination to save selection portion 106 selects a folder, the folder is informed to the server 2 as the destination of the shortcut 62.

When the server 2 selected makes a request for information for user authentication (user ID and password, for example), the source user enters such information. The shortcut transmission portion 107 sends the entered information to the server 2.

With the server 2, when receiving the shortcut 62 from the image processing apparatus 1, the shortcut registration portion 201 stores the shortcut 62 into the shortcut storage portion 202. Where the folder is specified as the destination of the shortcut 62, the shortcut registration portion 201 stores the shortcut 62 into the specified folder of the shortcut storage portion 202. The shortcut registration portion 201 then informs the image processing apparatus 1 of a Uniform Resource Locator (URL) specifying the saving location of the shortcut 62 and the file name. After the URL is informed, the connection between the image processing apparatus 1 and the server 2 may be terminated.

With the image processing apparatus 1, the e-mail message creating portion 108 creates an e-mail message 63 to be sent to the destination user. The title and body received by the job command receiving portion 101 are applied to the title and body of the e-mail message 63. The e-mail message creating portion 108 adds, to the body of the e-mail message 63, the message described below depending on the result of processing performed by the file providing method determination portion 104.

Where the file providing method determination portion 104 determines that the first providing method is used as the file providing method, the e-mail message creating portion 108 adds, to the body of the e-mail message 63, a message as shown in FIG. 8A containing a URL which specifies the file name and the saving location of the scanned image file 61 stored in the image file storage portion 103 and the job identifier of the Scan_To_E-Mail job.

Alternatively, where the file providing method determination portion 104 determines that the second providing method is used as the file providing method, the e-mail message creating portion 108 adds, to the body of the e-mail message 63, a message containing the URL informed by the server 2 as shown in FIG. 8B.

When the e-mail message creating portion 108 creates the e-mail message 63, the e-mail message transmission portion 109 sends the e-mail message 63 to the e-mail address of the destination user. Where the file providing method determination portion 104 determines that the third providing method is used as the file providing method, the e-mail message transmission portion 109 attaches, to the e-mail message 63, the scanned image file 61 obtained by the image file obtaining portion 102 and sends the e-mail message 63 to the e-mail address of the destination user.

The e-mail message 63 passes through the mail server and the like, and is received by the terminal 3 of the destination user.

In the meantime, a job of sending the e-mail message 63 after specifying a URL in the body of the e-mail message 63 instead of attaching the scanned image file 61 to the e-mail message 63 is generally called "Scan_To_URL job" in some cases.

In response to transmission of the e-mail message 63 by the e-mail message transmission portion 109, the transmission result storage portion 120 stores the transmission result data 64 thereinto.

The transmission result data 64 shows the job identifier (Job_ID), the file name, a download flag, and sent date and time. The "file name" is a file name of the scanned image file 61 stored in the image file storage portion 103. The "download flag" indicates whether or not the scanned image file 61 has been downloaded to the terminal 3. The default value thereof is "0 (zero)" which means that the scanned image file 61 has not been downloaded to the terminal 3. The "sent date and time" indicates the date and time at which the corresponding e-mail message 63 has been sent.

The transmission result data 64 is created every transmission of one e-mail message 63, and is stored into the transmission result storage portion 120. In this way, the transmission result data 64 is cumulated in the transmission result storage portion 120 as shown in FIG. 9.

The terminal 3 receives the e-mail message 63 by using the mailer, and displays the content of the e-mail message 63 (title and the body thereof, etc.). Where the scanned image file 61 is attached to the e-mail message 63, the terminal 3 displays an image represented in the scanned image file 61.

[Providing a Scanned Image File to the Terminal 3]

When the terminal 3 receives the e-mail message 63 to which no scanned image file 61 is attached, the destination user may cause the terminal 3 to perform processing for downloading the scanned image file 61 to display an image. The destination user clicks an URL in the body of the e-mail message 63.

In response to the URL clicked, the web browser of the terminal 3 is activated. The terminal 3 performs the processing for downloading the file based on the URL using the web browser. At this time, the image processing apparatus 1 and the server 2 perform processing for providing the file to the terminal 3. The description goes on to the flow of processing by the individual devices for the case where the URL specifies a domain corresponding to the image processing apparatus 1, and the flow of processing by the individual devices for the case where the URL specifies a domain corresponding to the server 2. The description is given with reference to sequence diagrams.

[Case where the URL Specifies a Domain Corresponding to the Image Processing Apparatus 1]

Figure 10:
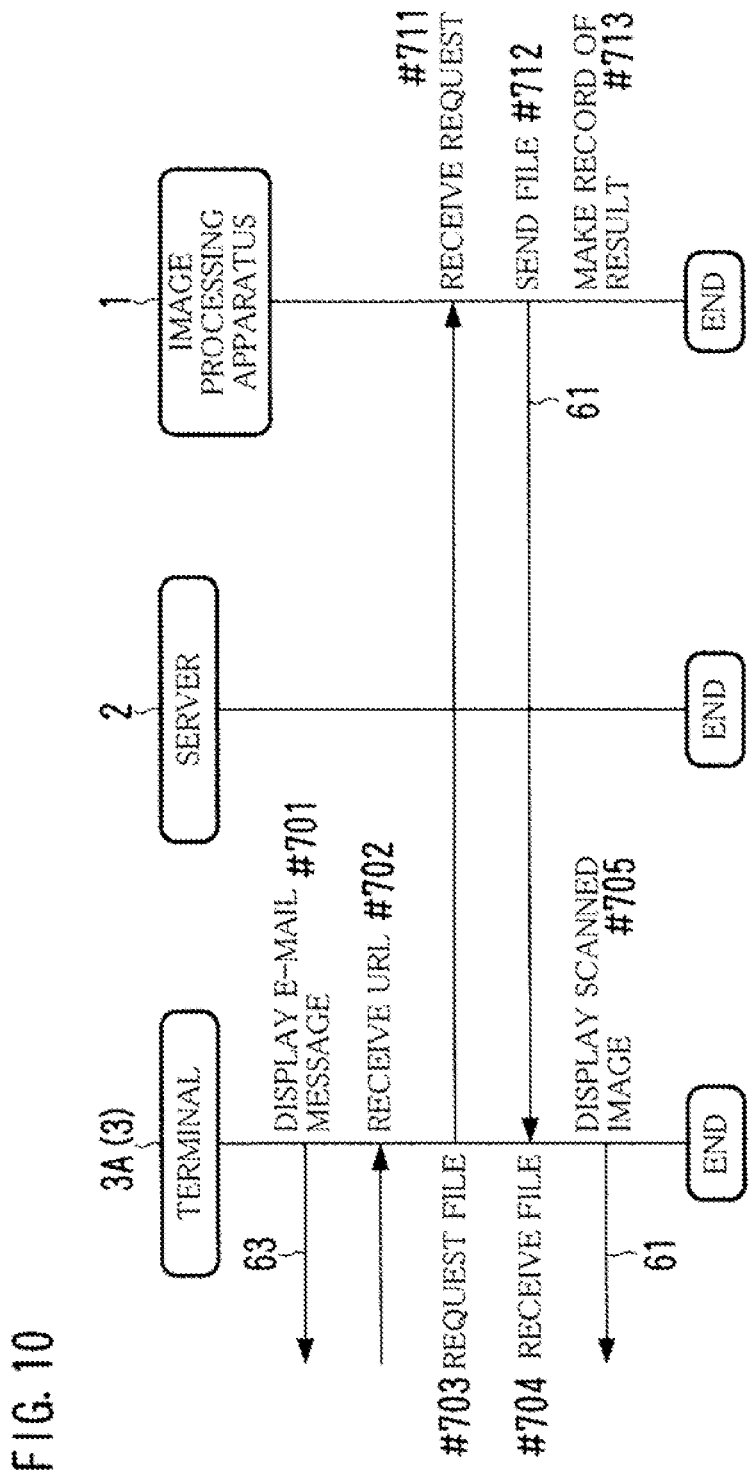
FIG. 10 is a sequence diagram depicting an example of the flow of processing performed by devices according to a first providing method.

FIG. 10 is a sequence diagram depicting an example of the flow of processing performed by the individual devices according to the first providing method.

Where the URL clicked specifies a domain corresponding to the image processing apparatus 1, the devices perform processing in the steps shown in FIG. 10. Hereinafter, an example is described in which the destination user operates the terminal 3A.

As described above, when receiving the e-mail message 63, the terminal 3A displays the content of the e-mail message 63 (title and body thereof, etc.) (Step #701 of FIG. 10). When the destination user clicks the URL in the body of the e-mail message 63, the terminal 3A receives the user operation (Step #702), accesses the image processing apparatus 1 based on the URL to request a file specified in the URL from the image processing apparatus 1 (Step #703). At this time, the terminal 3A informs the image processing apparatus 1 of a job identifier specified in the URL.

With the image processing apparatus 1, the image file transmission portion 133 receives the request for file from the terminal 3A (Step #711), reads the file (herein the scanned image file 61) out of the image file storage portion 103 to send the file to the terminal 3A (Step #712).

The image file transmission portion 133 searches, in the transmission result storage portion 120, for transmission result data 64 (FIG. 9) indicating the file name of the scanned image file 61 and the job identifier informed by the terminal 3A, and updates a download flag of the transmission result data 64 with "1" which means that the file has been downloaded (Step #713).

The terminal 3A receives the scanned image file 61 (Step #704), and displays an image represented in the scanned image file 61 (Step #705).

[Case where the URL Specifies a Domain Corresponding to the Server 2]

Figure 11:
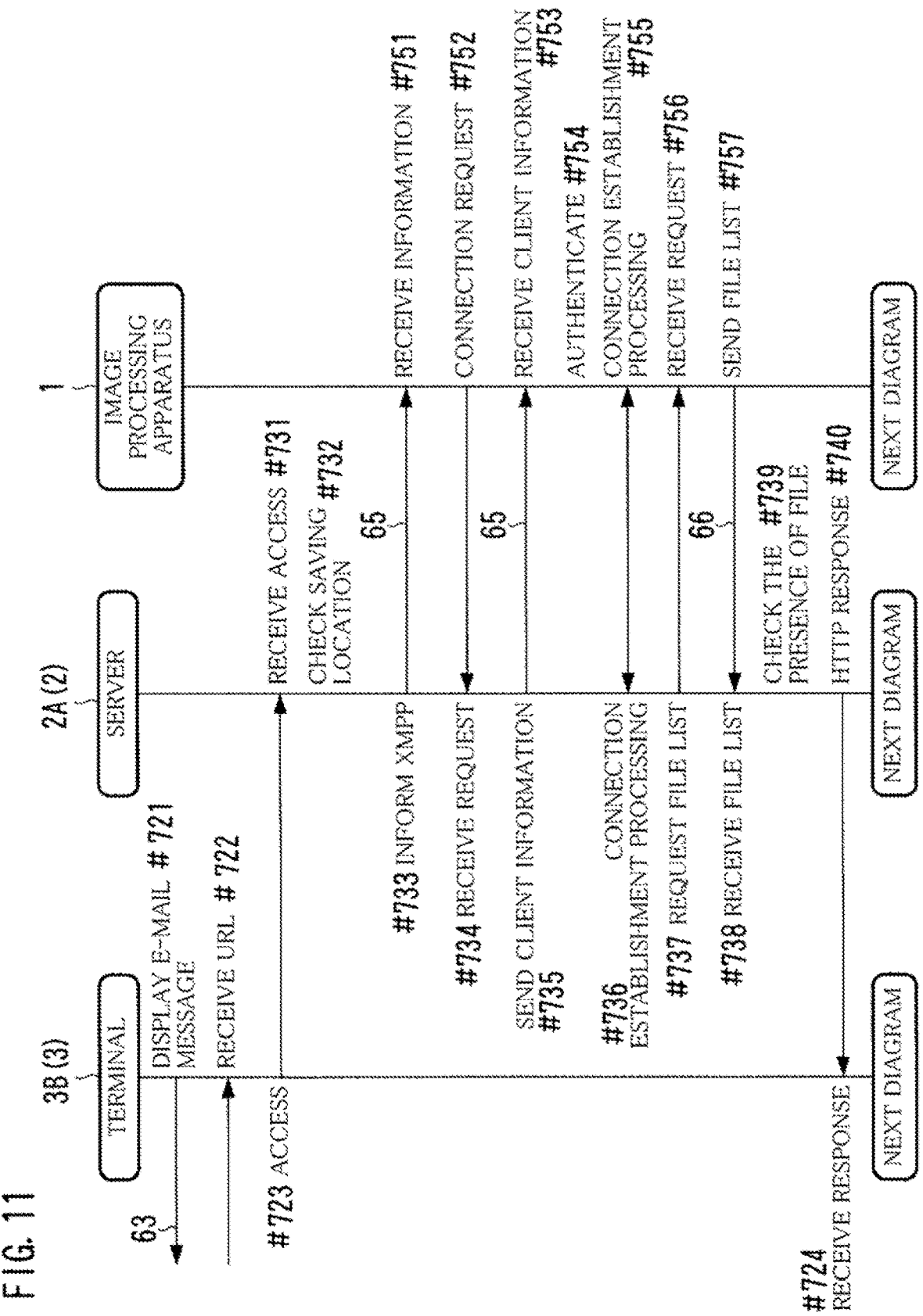
FIG. 11 is a sequence diagram depicting an example of the flow of processing performed by devices according to a second providing method.
Figure 12:
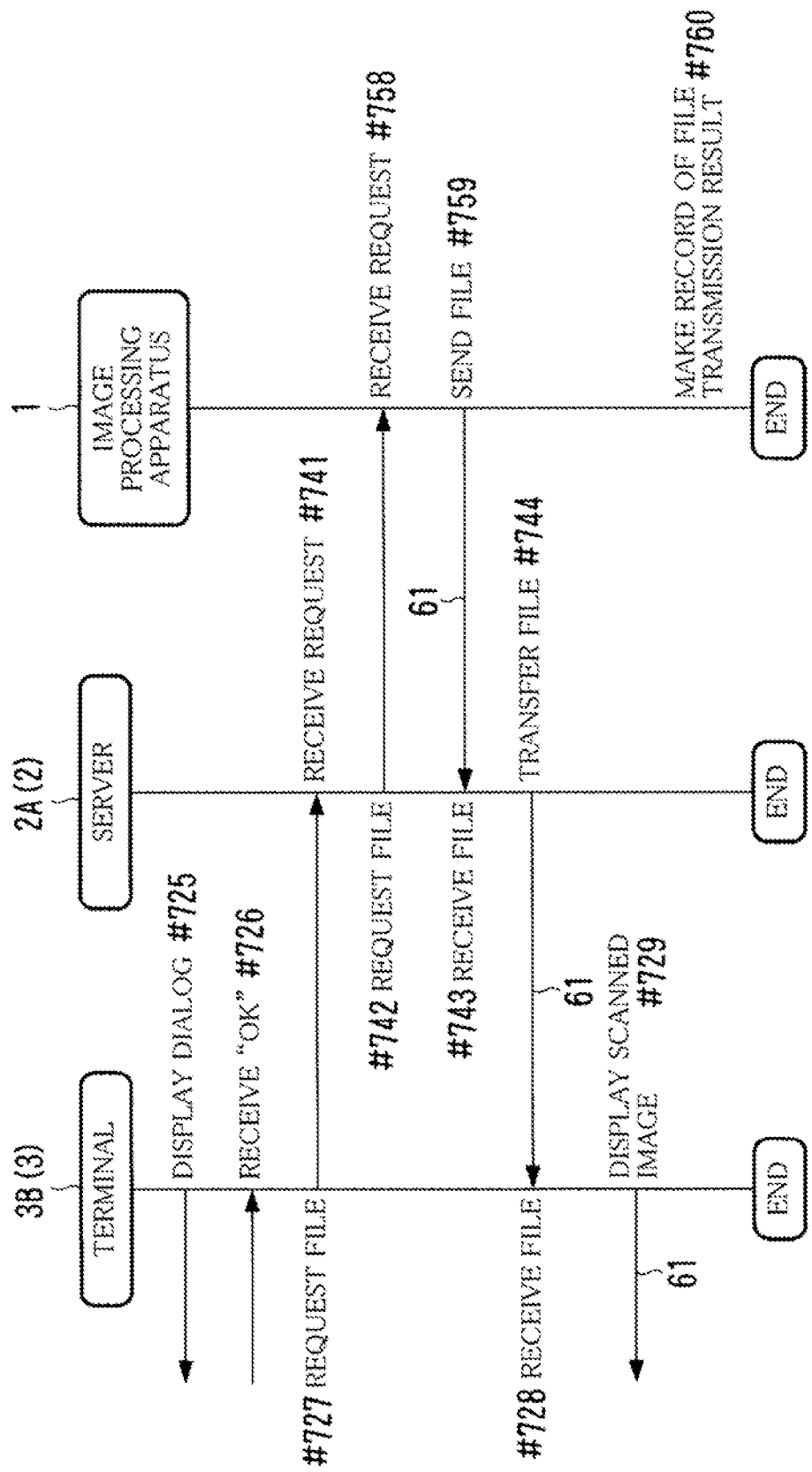
FIG. 12 is a sequence diagram depicting an example of the flow of processing performed by devices according to a second providing method.

FIGS. 11 and 12 are sequence diagrams depicting an example of the flow of processing performed by the individual devices according to the second providing method.

Where the URL clicked specifies a domain corresponding to the server 2, the devices perform processing in the steps shown in FIGS. 11 and 12. Hereinafter, an example is described in which the destination user operates the terminal 3B and the URL clicked specifies a domain corresponding to the server 2A.

As described above, when receiving the e-mail message 63, the terminal 3B displays the content of the e-mail message 63 (title and body thereof, etc.) (Step #721 of FIG. 11). When the destination user clicks the URL in the body of the e-mail message 63, the terminal 3B receives the user operation (Step #722), accesses the server 2A based on the URL to request a file specified in the URL from the server 2A (Step #723).

With the server 2A, the saving location check portion 231 receives the request for file from the terminal 3B (Step #731), reads the file (herein the shortcut 62) out of the shortcut storage portion 202 to check a saving location of the file indicated in the shortcut 62 (Step #732).

When the server 2A requests for information for user authentication, the destination user enters the information. The terminal 3B sends the entered information to the server 2A.

When the saving location check portion 231 confirms that the saving location of the file is the image processing apparatus 1, the connection establishment processing portion 232 and the connection establishment processing portion 131 of the image processing apparatus 1 work in coordination to perform processing for establishing connection between the server 2A and the image processing apparatus 1 in the following way.

The connection establishment processing portion 232 accesses the image processing apparatus 1 based on a protocol such as XMPP (Step #733). The IP address of the image processing apparatus 1 may be stored, in advance, into the connection establishment processing portion 232. Alternatively, the IP address of the image processing apparatus 1 may be described in the shortcut 62 by the image processing apparatus 1.

In response to access from the image processing apparatus 1 (Step #751), the connection establishment processing portion 131 requests, from the server 2A, account data 65 indicating the XMPP client information (Step #752).

When receiving the request (Step #734), the connection establishment processing portion 232 sends the account data 65 to the image processing apparatus 1 (Step #735).

When receiving the account data 65 (Step #753), the connection establishment processing portion 131 authenticates the server 2A based on the XMPP client information indicated in the account data 65 (Step #754). If the XMPP client information is authorized information, in other words, if the XMPP client information is the same as that registered in the image processing apparatus 1, the server 2A is successfully authenticated.

Upon the successful authentication, the connection establishment processing portion 131 and the connection establishment processing portion 232 establish a connection between the image processing apparatus 1 and the server 2A (Step #736, Step #755).

With the server 2A, when the connection is established, the file list obtaining portion 233 requests a file list from the image processing apparatus 1 (Step #737), and obtains list data 66 described later (Step #738).

With the image processing apparatus 1, when receiving the request from the server 2A (Step #756), the file list transmission portion 132 generates list data 66 indicating file names of all of the scanned image files 61 stored in the image file storage portion 103 to send the list data 66 to the server 2A (Step #757).

With the server 2A, when obtaining the list data 66, the file presence check portion 234 checks whether or not the image processing apparatus 1 saves, therein, the scanned image file 61 desired by the destination user (hereinafter, referred to as a "target file") (Step #739). If the file name indicated in the shortcut 62 read out in Step #732 is included in the list data 66 received in Step #738, then it can be determined that the image processing apparatus 1 saves the target file.

Where the file presence check portion 234 confirms that the image processing apparatus 1 saves the target file, the access responding portion 235 responds to the request from the terminal 3B (Hypertext Transfer Protocol (HTTP) response) (Step #740). At this time, the access responding portion 235 inquires of the terminal 3B whether or not to need the target file.

The terminal 3B receives the HTTP response (Step #724) and displays a dialog box to prompt the destination user to select whether or not to download the target file (Step #725 of FIG. 12). When receiving user's entry to the effect that the target file may be download (Step #726), the terminal 3B requests the server 2A to download the target file (Step #727). The terminal 3B may request the server 2A to download the target file without receiving the selection by the user.

With the server 2A, when the request for downloading is received (Step #741), the image file obtaining portion 236 and the image file transfer portion 237 perform processing for providing the target file to the terminal 3B in the following manner.

The image file obtaining portion 236 requests the target file from the image processing apparatus 1 (Step #742), and obtains the target file therefrom (Step #743). At the time of the request, the image file obtaining portion 236 informs the image processing apparatus 1 of the file name indicated in the shortcut 62 and the job identifier informed by the terminal 3B.

With the image processing apparatus 1, when receiving the request and the information (Step #758), the image file transmission portion 133 reads the target file, i.e., the scanned image file 61 having the file name informed by the server 2A, out of the image file storage portion 103, and sends the target file to the server 2A (Step #759).

As with the case of the transmission of the scanned image file 61 without using the servers 2, the image file transmission portion 133 searches, in the transmission result storage portion 120, for transmission result data 64 (FIG. 9) indicating the file name of the target file and the job identifier informed by the terminal 3B, and updates the download flag of the transmission result data 64 with "1" (Step #760).

With the server 2A, the image file transfer portion 237 receives the target file from the image processing apparatus 1 and transfers the target file to the terminal 3B (Step #744).

The terminal 3B receives the target file from the server 2A (Step #728) and displays an image represented in the target file (Step #729).

[Deleting a Scanned Image File]

The image file deletion portion 134 performs processing for deleting the scanned image file 61 from the image file storage portion 103 in the following way.

The image file deletion portion 134 searches, in the transmission result storage portion 120, for transmission result data 64 indicating a download flag of "1". The image file deletion portion 134 then deletes, from the image file storage portion 103, the scanned image file 61 of which a file name is indicated in the transmission result data 64 found out by the search. At this time, the image file deletion portion 134 further deletes the transmission result data 64 from the transmission result storage portion 120.

Alternatively, the image file deletion portion 134 searches, in the transmission result storage portion 120, for transmission result data 64 of which a sent date and time is different from the current date and time by a predetermined period or longer. The image file deletion portion 134 then deletes, from the image file storage portion 103, the scanned image file 61 of which a file name is indicated in the transmission result data 64 found out by the search. The image file deletion portion 134 deletes the transmission result data 64 from the transmission result storage portion 120.

The image data deletion portion 134 may perform the processing for deleting the scanned image file 61 and the transmission result data 64 every time the image file transmission portion 133 sends the scanned image file 61. Alternatively, the image data deletion portion 134 may perform the processing at constant intervals, for example, every 24 hours.

Figure 13:
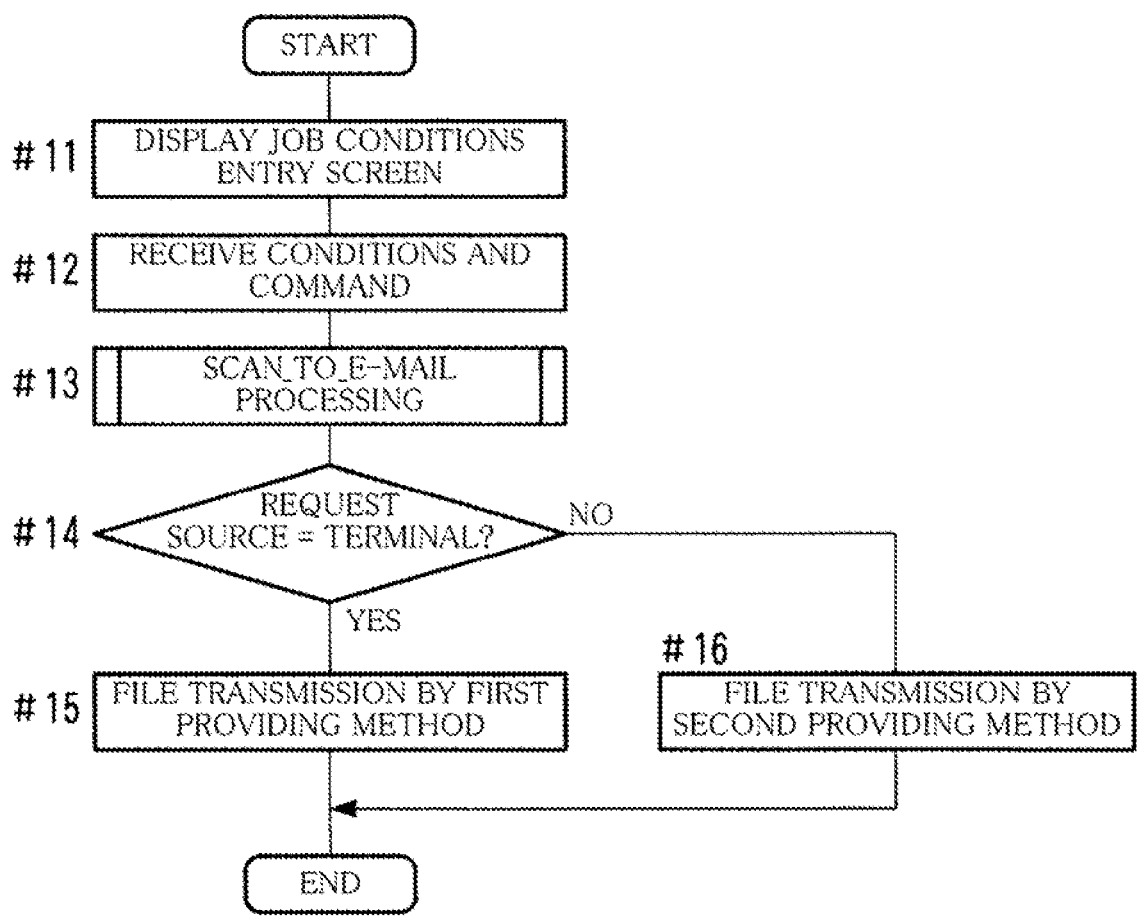
FIG. 13 is a flowchart for depicting an example of the flow of the overall processing performed by an image forming apparatus.
Figure 14:
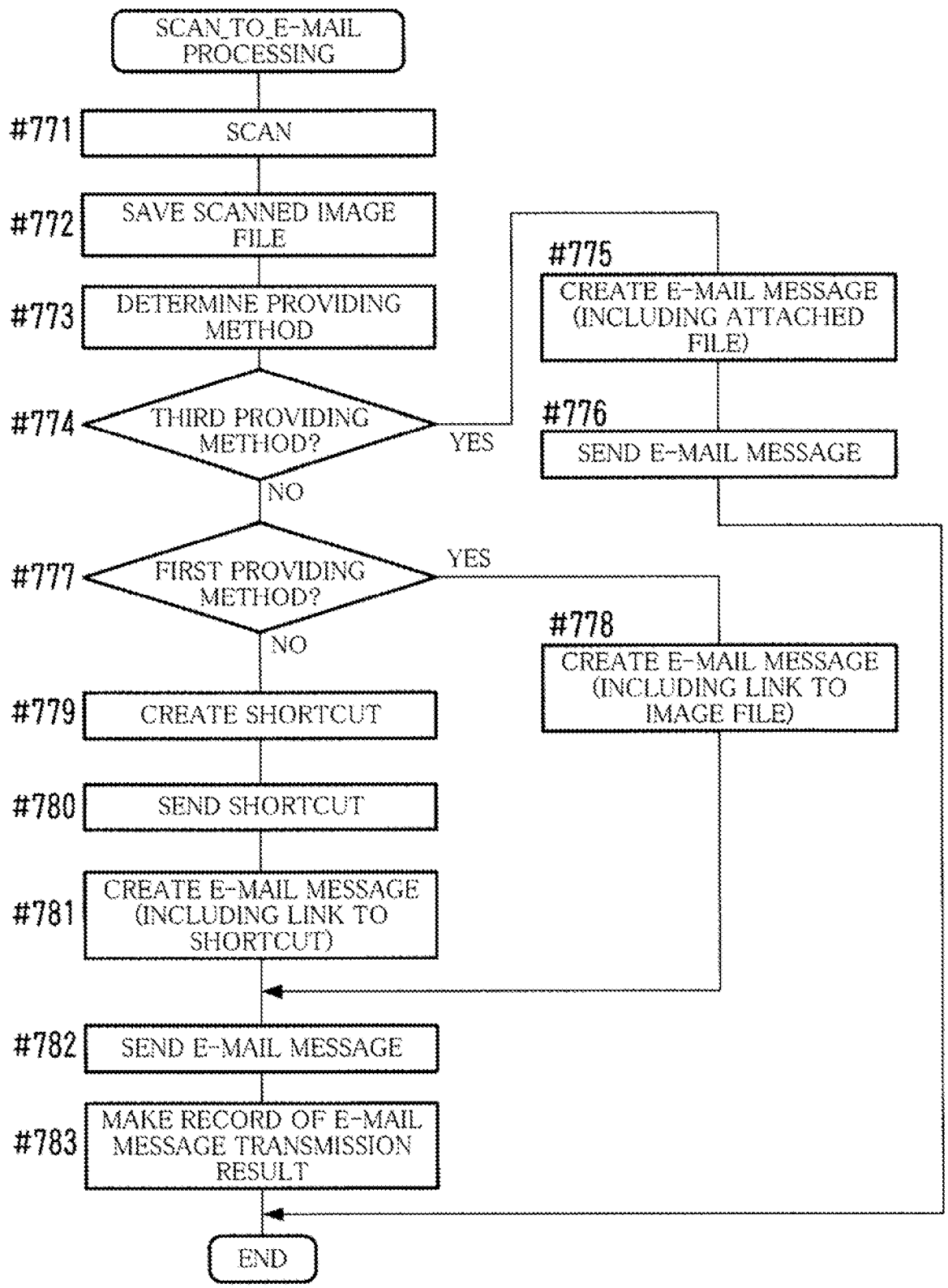
FIG. 14 is a flowchart for depicting an example of the flow of Scan_To_Mail processing.

FIG. 13 is a flowchart for depicting an example of the flow of the overall processing performed by the image processing apparatus 1. FIG. 14 is a flowchart for depicting an example of the flow of Scan_To_E-Mail processing.

The description goes on to the flow of the overall processing performed by the image processing apparatus 1 for the case of providing the terminal 3 with the scanned image file 61. The description is provided below with reference to the flowcharts.

The image processing apparatus 1 performs the processing involving steps depicted in FIG. 13 based on the file providing program 10P.

When the source user performs predetermined operation, the image processing apparatus 1 displays the job conditions entry screen 51 (FIG. 7) (Step #11 of FIG. 13). The source user places a paper sheet having an image depicted therein in the scanner unit 10j, and enters conditions for a Scan_To_E-Mail job and a command for execution thereof.

In response to the user operation, the image processing apparatus 1 receives the conditions and the command (Step #12), and executes processing for the Scan_To_E-Mail job (Step #13). The steps for the processing are depicted in FIG. 14.

The image processing apparatus 1 scans the paper sheet placed, generates a scanned image file 61 (Step #771), and saves the scanned image file 61 (Step #772). The image processing apparatus 1 then determines a method for providing the scanned image file 61 to the terminal 3 (Step #773).

If determining to use the third providing method (YES in Step #774), then the image processing apparatus 1 creates an e-mail message 63 to which the scanned image file 61 is attached (Step #775), and sends the e-mail message 63 to the designated e-mail address (Step #776).

If determining to use the first providing method (NO in Step #774, YES in Step #777), then the image processing apparatus 1 creates an e-mail message 63 having a message (FIG. 8A) containing an URL for the scanned image file 61 (Step #778).

If determining to use the second providing method (NO in Step #774, NO in Step #777), then the image processing apparatus 1 creates a shortcut 62 specifying the saving location and file name of the scanned image file 61 and a job identifier (Step #779), and sends the shortcut 62 to the server 2 (Step #780). At this time, the image processing apparatus 1 selects a folder appropriately which can be used by both the source user and the destination user.

Upon the receipt of the shortcut 62, the server 2 saves the shortcut 62 thereto. Where a folder is selected, the server 2 saves the shortcut 62 to the folder selected. The image processing apparatus 1 then creates an e-mail message 63 having a message (FIG. 8B) including an URL for the shortcut 62 saved to the server 2 (Step #781).

The image processing apparatus 1 sends the e-mail message 63 created in Step #778 or Step #781 to the designated e-mail address (Step #782). The image processing apparatus 1 then generates transmission result data 64 to store the transmission result data 64 (Step #783).

Referring back to FIG. 13, when being accessed from the terminal 3 (YES in Step #14), the image processing apparatus 1 performs the processing for sending the scanned image file 61 to the terminal 3 in the steps depicted in FIG. 10 (Step #15).

When being accessed from the server 2 (NO in Step #14), the image processing apparatus 1 performs the processing for sending the scanned image file 61 via the server 2 to the terminal 3 in the steps depicted in FIGS. 11 and 12 (Step #16).

The image processing apparatus 1 performs, at a predetermined time, processing for deleting the scanned image file 61 and the transmission result data 64.

According to this embodiment, image data having a large size can be provided from a user to another user more easily than is conventionally possible.

In this embodiment, the scanned image file 61 is saved to a storage of the image processing apparatus 1, for example, to the large-capacity storage 10e. Instead of this, the scanned image file 61 may be saved to a Network Attached Storage (NAS) included in the intranet 41.

In this embodiment, where a domain indicated in an e-mail address of a destination user is different from the domain of the corporation 90, it is determined to use the second providing method as the file providing method, and the second providing method is used to provide the scanned image file 61 to the destination user. Instead of this, however, it is possible to determine to use a fourth providing method to provide the scanned image file 61 to the destination user.

The fourth providing method is a method in which, instead of the shortcut 62, the scanned image file 61 is saved to any of the servers 2, and in response to a request from the terminal 3, the scanned image file 61 is provided to the terminal 3 without establishing a connection between the image processing apparatus 1 and the server 2.

The description goes on to the processing by the individual portions of the devices shown in FIG. 5 for the case of using the fourth providing method. Description of points common to the first providing method or the second providing method shall be omitted.

With the image processing apparatus 1, where a domain indicated in an e-mail address of a destination user is different from the domain of the corporation 90, the file providing method determination portion 104 determines to use the fourth providing method as the file providing method.

The shortcut generating portion 105 does not generate a shortcut 62. The shortcut transmission portion 107 thus does not send a shortcut 62 to the server 2. However, the shortcut transmission portion 107 sends, to the server 2, the scanned image file 61 instead of the shortcut 62.

With the server 2, the shortcut registration portion 201 stores, into the shortcut storage portion 202, the scanned image file 61 sent by the image processing apparatus 1 instead of the shortcut 62.

With the image processing apparatus 1, the e-mail message creating portion 108 generates an e-mail message 63 and issues a job identifier, as with the case of the first providing method. It is noted, however, that the e-mail message creating portion 108 adds, to the body of the e-mail message 63, a message including a URL which specifies the job identifier, the file name and saving location of the scanned image file 61 stored in the shortcut storage portion 202.

The e-mail message transmission portion 109 sends the e-mail message 63 to the e-mail address of the destination user, as with the case of the first providing method or the second providing method.

The transmission result storage portion 120 stores the transmission result data 64 (FIG. 9) as with the case of the first providing method or the second providing method.

The terminal 3 receives the e-mail message 63 to display the content thereof as with the case of the first providing method or the second providing method. In response to click operation on the URL of the body of the message by the destination user, the terminal 3 uses the web browser to perform processing for downloading a file based on the URL.

Instead of the image processing apparatus 1, the terminal 3 accesses the server 2 specified in the URL to perform the processing shown in Step #703 through Step #705 of FIG. 10 with the server 2. In connection with this, the server 2 performs the processing shown in Step #711 through Step #712.

Thereby, the scanned image file 61 is downloaded to the terminal 3, so that an image represented in the scanned image file 61 is displayed in the terminal 3.

It is noted that using the fourth providing method instead of the second providing method, in other words, saving the scanned image file 61 to the server 2, is preferably limited to the case where no security concerns are present. For example, using the fourth providing method is preferably limited to any one of the following cases:

(Case b1): An image represented in the scanned image file 61 shows a known document;

(Case b2): An image represented in the scanned image file 61 does not have any of predetermined character strings such as "important", "confidential", "secret" "classified" and "handle with care"; and (Case b3): The scanned image file 61 is encrypted.

As for Case b3, it is preferable to attach, to the e-mail message 63, a key for decrypting the scanned image file 61 and send the email-message.

Where the source user selects, in the job conditions entry screen 51 (FIG. 7), a plurality of e-mail addresses as a destination to which the scanned image file 61 is to be sent, the image processing apparatus 1 preferably determines the file providing method by using the following first determination method through third determination method.

(First Determination Method)

In Step #773 of FIG. 14, the image processing apparatus 1 determines file providing methods separately for the selected e-mail addresses.

Thereafter, the image processing apparatus 1 performs, for each of the selected e-mail addresses, processing for sending an e-mail message 63, and so on (Step #774 through Step #783).

Alternatively, the image processing apparatus 1 may perform, as a series of processing, the processing from Step #773 through Step #783 for each of the selected e-mail addresses.

Yet alternatively, the image processing apparatus 1 may perform processing of one or more steps for each of the selected e-mail addresses. For example, the image processing apparatus 1 may perform the processing for determining a providing method for the selected e-mail addresses one by one (Step #773). Then, the image processing apparatus 1 may perform processing for generating an e-mail message 63 to send the same for the selected e-mail addresses one by one (Step #774 through Step #783).

[Second Determination Method]

In Step #773, the image processing apparatus 1 makes a group of, for each of the domains, the selected e-mail addresses. The image processing apparatus 1 then determines file providing methods on a group-by-group basis.

Thereafter, the image processing apparatus 1 performs, for each of the groups, processing for sending an e-mail message 63, and so on (Step #774 through Step #783). At this time, the image processing apparatus 1 may send the e-mail message 63 to a multiple of e-mail addresses of the same group.

[Third Determination Method]

In Step #773 of FIG. 14, the image processing apparatus 1 assigns all of the selected e-mail addresses to one group. Where the third providing method is not used, and further, where all of the terminals 3 in which any of the selected e-mail address is set are included in the intranet 41, the image processing apparatus 1 determines to use the first providing method for all the e-mail addresses. Otherwise, the image processing apparatus 1 determines to use the second providing method.

After that, the image processing apparatus 1 performs processing, on the group, for sending the e-mail message 63, etc. (Step #774 through Step #783) as with the case of the second determination method. At this time, the image processing apparatus 1 sends the e-mail message 63 to the multiple of e-mail addresses of the same group.

Where e-mail addresses are selected as destinations to which the scanned image file 61 is to be provided, it is desirable that the image processing apparatus 1 sends the scanned image file 61 to all of the terminals 3 in which any of the e-mail addresses is set, and then, deletes the scanned image file 61. Alternatively, the image processing apparatus 1 may delete the scanned image file 61 after a predetermined amount of time has elapsed since the e-mail message 63 was sent.

In order to inform the server 2 which of the e-mail addresses is set in the terminal 3, the URL contained in the body of the e-mail message 63 may be changed for each destination user. For example, an e-mail address of a destination user or a code for identifying the e-mail address of the destination user may be set at a part of the URL as a parameter. When the URL is clicked, the terminal 3 may inform the server 2 of the parameter.

Alternatively, a sub folder may be provided for each of the e-mail addresses of the destination users, and the scanned image file 61 may be saved to each sub folder. In such a case, the URL contained in the body of the e-mail message 63 is so changed, for each of the e-mail addresses of the destination users, to indicate a sub folder corresponding to the e-mail address.

The result of transmission of the scanned image file 61 may be managed by the image processing apparatus 1, or may be managed by the server 2. In the case of management by the image processing apparatus 1, for every transmission of the scanned image file 61, the server 2 informs the image processing apparatus 1 of the transmission destination of the scanned image file 61. After the scanned image file 61 is completely sent to all of the terminals 3, the image processing apparatus 1 instructs the server 2 to delete the scanned image file 61.

In this embodiment, the image processing apparatus 1 selects, from among the servers 2, a server 2 to save the shortcut 62 thereto, namely, a server 2 to relay the scanned image file 61 in accordance with the domain of the e-mail address of the destination user. Instead of this, the image processing apparatus 1 may make such a selection based on another parameter (condition). For example, the image processing apparatus 1 may make such a selection based on three parameters: the confidentiality of the scanned image file 61; the robustness of the server 2; and the accessibility of the server 2 in the following manner.

On one hand, where the confidentiality of the scanned image file 61 is below a predetermined level, the image processing apparatus 1 preferentially selects a server 2 having accessibility higher than those of the other servers 2.

The confidentiality of the scanned image file 61 may be determined based on the number of predetermined character strings (for example, "important", "confidential", "secret"

"classified" and "handle with care") included in an image represented in the scanned image file 61 or a ratio of the number of such predetermined character strings to the number of all characters. Alternatively, the source user may designate the confidentiality of the scanned image file 61.

The accessibility of the server 2 may be determined, in advance, in the following order: (c1) The server 2 has a folder accessible by anybody irrespective of the presence/absence of a user account issued by the server 2; (c2) The server 2 has a folder accessible by any user who has a user account issued by the server 2: (c3) The server 2 has a folder which can be accessed only by a specific user (including source user) who has a user account issued by the server 2 and which is owned by a destination user; and (c4) The server 2 has a folder which can be accessed only by a specific user (including destination user) who has a user account issued by the server 2 and which is owned by a source user. Alternatively, an administrator of the image processing apparatus 1 may preset the accessibility of the server 2.

On the other hand, where the confidentiality of the scanned image file 61 is equal to or higher than the predetermined level, the image processing apparatus 1 preferentially selects a server 2 having robustness higher than those of the other servers 2.

The robustness of the server 2 may be determined, in advance, based on: (d1) The password strength of a password used for logging into the server 2; (d2) The level of encryption technique used in the server 2; (d3) The limitation on a protocol or device which can access the server 2; and so on.

The processing for deleting the scanned image file 61 from the image processing apparatus 1 or the server 2 may be performed only when the confidentiality of the scanned image file 61 is equal to or higher than the predetermined level. Stated differently, it is possible not to perform the deletion processing when the confidentiality of the scanned image file 61 is below the predetermined level.

Where the confidentiality of the scanned image file 61 is below the predetermined level, and further, where the urgency of the scanned image file 61 is equal to or higher than a predetermined level, the image processing apparatus 1 may select the folder corresponding to (c1) discussed above or the folder corresponding to (c2), and the server 2 having the same.

The urgency may be determined based on the number of predetermined character strings (for example, "as soon as possible", and "urgent") included in an image represented in the scanned image file 61 or a ratio of the number of such predetermined character strings to the number of all characters. Alternatively, the source user may designate the urgency of the scanned image file 61.

Which of the scanned image file 61 and the shortcut 62 is to be saved to the server 2 may be determined in accordance with the robustness of the server 2 or the confidentiality of the scanned image file 61. For example, where the robustness is equal to or higher than the predetermined level, the scanned image file 61 is saved to the server 2. Otherwise, the shortcut 62 is saved thereto. Alternatively, where the confidentiality is equal to or higher than the predetermined level, the shortcut 62 is saved to the server 2. Otherwise, the scanned image file 61 is saved thereto.

It is to be understood that the overall configuration of the image data providing system 100, the image processing apparatus 1, and the server 2, the constituent elements thereof, the content and order of the processing, the structure of data, the configuration of screen, and the like can be appropriately modified without departing from the spirit of the present invention.

Although the present invention has been described and illustrated in detail, it is clearly understood that the present invention is by way of illustrated and example only and is not to be taken by way of limitation, the scope of the present invention being interpreted by terms of the appended claims.

What is claimed is:

1. An image processing apparatus comprising:
a transmitter;
a scanner configured to read an image depicted on paper to create image data of the image;
a storage configured to save the image data created by the scanner; and
a processor configured to select an intermediary from among a group of candidates including at least one or more servers based on a designated e-mail address; wherein
in response to any of said one or more servers being selected as the intermediary, the transmitter sends to the selected server location data indicating a saving location of the image data saved to the storage in order to provide a terminal with the image data saved to the storage via the selected server,
the transmitter sends, to the designated e-mail address, an e-mail message including access information for accessing the location data, and
in response to any of said one or more servers that has been accessed by the terminal based on the access information requesting the image data, the transmitter sends the image data to the accessed server,
wherein the processor selects, from among said one or more servers, a server which can be used by a destination user corresponding to the e-mail address as the intermediary in decreasing order of priority from:
a server which is owned by a source user providing the image data and is provided with a storage area available to a first specific user including at least the destination user;
a server which is owned by the destination user and is provided with a storage area available to a specific user including at least the source user;
a server which is owned by the source user and is provided with a storage area allowing public access; and
a server which is owned by a person other than the source user and is provided with a storage area allowing public access.

2. The image processing apparatus according to claim 1, wherein, as long as the e-mail address is issued by an Internet Service Provider (ISP), the processor selects, from among said one or more servers, a server of the ISP as the intermediary.

3. The image processing apparatus according to claim 1, wherein, when confidentiality of the image is equal to or higher than a predetermined level, the processor preferentially selects, from among said one or more servers, a server having higher robustness as the intermediary.

4. The image processing apparatus according to claim 1, wherein, when confidentiality of the image is below a predetermined level and further when the image shows an urgent matter, the processor selects a server having a storage area allowing public access as the intermediary.

5. The image processing apparatus according to claim 1, wherein the group of candidates further includes the storage, when the e-mail address is used by a device included in a network where the image processing apparatus is included, the processor selects the storage as the intermediary, and in response to a request for the image data from the terminal based on the access information, the transmitter sends the image data requested to the terminal.

6. The image processing apparatus according to claim 1, comprising a deletion portion configured to delete the image data from the storage after the transmitter sends the image data.

7. The image processing apparatus according to claim 2, wherein, when a plurality of e-mail addresses is designated as the e-mail address, the processor selects, from among the group of candidates, a candidate which can be shared by users having the plurality of e-mail addresses as the intermediary.

8. The image processing apparatus of claim 1, wherein the transmitter sends the image data to the requesting server in response to the requesting server being accessed by the terminal and requesting the image data.

9. The image processing apparatus according to claim 1, wherein the transmitter sends the image data to the requesting server in response to receiving a request for downloading the image data.

10. A non-transitory recording medium storing a computer-readable program used in an image processing apparatus, the image processing apparatus including a scanner for reading an image depicted on paper to create image data of the image, the computer-readable program controlling the image processing apparatus to perform processing comprising:

saving the image data created by the scanner to a storage;

selecting an intermediary from among a group of candidates including at least one or more servers based on an e-mail address designated;

sending, in response to any of said one or more servers being selected as the intermediary, location data indicating a saving location of the image data saved to the storage or the image data saved to the storage to the selected server in order to provide a terminal with the image data saved to the storage via the selected server;

sending, to the e-mail address, an e-mail message including access information for accessing the location data or the image data saved to the intermediary; and in response to any of said one or more servers that has been accessed by the terminal based on the access information requesting the image data, and further, when data corresponding to the access information is the location data, sending the image data to the requesting server, wherein the computer-readable program controls the image processing apparatus to perform, as the selection processing, processing of selecting, from among said one or more servers, a server which can be used by a destination user corresponding to the e-mail address as the intermediary in decreasing order of priority from:

a server which is owned by a source user providing the image data and is provided with a storage area available to a first specific user including at least the destination user;

a server which is owned by the destination user and is provided with a storage area available to a specific user including at least the source user;

a server which is owned by the source user and is provided with a storage area allowing public access; and a server which is owned by a person other than the source user and is provided with a storage area allowing public access.

11. The non-transitory recording medium according to claim 10, wherein, as long as the e-mail address is issued by an Internet Service Provider (ISP), the computer-readable program controls the image processing apparatus to perform, as the selection processing, processing of selecting, from among said one or more servers, a server of the ISP as the intermediary.

12. The non-transitory recording medium according to claim 10, wherein, when confidentiality of the image is equal to or higher than a predetermined level, the computer-readable program controls the image processing apparatus to perform, as the selection processing, processing of selecting, from among said one or more servers, a server having higher robustness as the intermediary.

13. The non-transitory recording medium according to claim 10, wherein, when confidentiality of the image is below a predetermined level and further when the image shows an urgent matter, the computer-readable program controls the image processing apparatus to perform, as the selection processing, processing of selecting a server having a storage area allowing public access as the intermediary.

14. The non-transitory recording medium according to claim 10, wherein the group of candidates further includes the storage, when the e-mail address is used by a device included in a network where the image processing apparatus is included, the computer-readable program controls the image processing apparatus to perform, as the selection processing, processing of selecting the storage as the intermediary, and in response to a request for the image data from the terminal based on the access information, the computer-readable program controls the image processing apparatus to perform, as the third transmission processing, processing of sending the image data requested to the terminal.

15. The non-transitory recording medium according to claim 10, wherein the computer-readable program controls the image processing apparatus to perform deletion processing of deleting the image data from the storage after the image data is sent.

* * * * *